United States Patent
Lin-Hendel

(10) Patent No.: US 9,517,946 B2
(45) Date of Patent: Dec. 13, 2016

(54) METHOD AND SYSTEM FOR WATER RECLAMATION, PURIFICATION, AND REUSE FOR RESIDENTIAL, COMMERCIAL, AND AGRICULTURAL APPLICATIONS

(71) Applicant: Catherine G. Lin-Hendel, Summit, NJ (US)

(72) Inventor: Catherine G. Lin-Hendel, Summit, NJ (US)

( * ) Notice: Subject to any disclaimer, the term of this patent is extended or adjusted under 35 U.S.C. 154(b) by 0 days.

(21) Appl. No.: 14/214,654

(22) Filed: Mar. 14, 2014

(65) Prior Publication Data
US 2015/0021247 A1   Jan. 22, 2015

Related U.S. Application Data

(60) Provisional application No. 61/782,659, filed on Mar. 14, 2013.

(51) Int. Cl.
C02F 1/00 (2006.01)
E03B 1/04 (2006.01)
(Continued)

(52) U.S. Cl.
CPC .............. *C02F 1/00* (2013.01); *C02F 1/004* (2013.01); *C02F 1/008* (2013.01); *E03B 1/041* (2013.01);
(Continued)

(58) Field of Classification Search
CPC ............ C02F 1/00; C02F 1/004; C02F 1/006; C02F 1/007; C02F 9/00; C02F 2103/001; C02F 2103/002; C02F 2103/005; C02F 2103/34; C02F 2301/04; C02F 2301/046; C02F 1/008; C02F 2001/007; C02F 2209/005; C02F 2209/006; C02F 2209/02; C02F 2209/40; E03B 1/041; E03B 1/042; E03B 1/048; E03B 2001/047; E03B 3/02; E03B 3/03; E03B 7/02; E03B 7/08; E03B 3/40; E03B 5/10; E03B 5/105; E03B 7/07; E03B 7/074; E03B 11/00; E03B 11/02; E03B 2001/045; E03F 5/10; E03F 5/105
(Continued)

(56) References Cited

U.S. PATENT DOCUMENTS 4,197,597 A * 4/1980 Toms ................................ 4/300
4,812,237 A * 3/1989 Cawley et al. ............... 210/605
(Continued)

OTHER PUBLICATIONS

Publication: Diana Christova-Boal et al, "An investigation into greywater reuse for urban residential properties", Desalination vol. 106, 1996, pp. 391-397.*

*Primary Examiner* — Joseph Drodge
(74) *Attorney, Agent, or Firm* — Barnes & Thornburg, LLP; Thomas J. McWilliams

(57) ABSTRACT

A water reclamation system includes a drainage lane overlaying a downward graded area of land and configured to receive water run-off from the land. At least one collection ditch coupled to the at least one drainage lane is configured to receive water from the drainage lane. At least one collection pipe housed is within and extends outwardly from the at least one collection ditch. A first container is coupled to the at least one collection pipe and configured to receive water from the at least one collection pipe. Housed within the first container is at least one water purifying filter and a pump configured to evacuate at least a portion of water within the container to a destination. A second container is in communication with the first container and is configured to: subject water received from the first container to a purification process; and store the purified water.

13 Claims, 10 Drawing Sheets

(51) Int. Cl.
*E03B 7/07* (2006.01)
*E03B 7/08* (2006.01)
*E03B 11/02* (2006.01)
*C02F 103/00* (2006.01)
*C02F 1/28* (2006.01)
*C02F 1/32* (2006.01)
*C02F 1/44* (2006.01)
*C02F 1/66* (2006.01)
*C02F 1/76* (2006.01)
*C02F 1/78* (2006.01)

(52) U.S. Cl.
CPC .............. *E03B 1/042* (2013.01); *C02F 1/283* (2013.01); *C02F 1/32* (2013.01); *C02F 1/441* (2013.01); *C02F 1/442* (2013.01); *C02F 1/66* (2013.01); *C02F 1/76* (2013.01); *C02F 1/78* (2013.01); *C02F 2103/001* (2013.01); *C02F 2103/002* (2013.01); *C02F 2303/04* (2013.01); *C02F 2303/16* (2013.01); *C02F 2303/24* (2013.01); *E03B 2001/045* (2013.01); *E03B 2001/047* (2013.01); *Y02W 10/37* (2015.05)

(58) Field of Classification Search
USPC .......... 210/170.01, 170.03, 194, 195.1, 104, 210/257.1, 258, 259; 405/36, 51, 52; 137/571
See application file for complete search history.

(56) References Cited

U.S. PATENT DOCUMENTS

| | | | | |
|---|---|---|---|---|
| 5,106,493 A * | 4/1992 | McIntosh | 210/100 |
| 5,192,426 A * | 3/1993 | DeCoster et al. | 210/117 |
| 5,217,042 A * | 6/1993 | Delle Cave | 137/357 |
| 5,396,745 A * | 3/1995 | Klein | 52/169.6 |
| 5,498,330 A * | 3/1996 | Delle Cave | 210/103 |
| 5,995,895 A * | 11/1999 | Watt et al. | 701/50 |
| 7,315,800 B2 * | 1/2008 | Meiners et al. | 703/7 |
| 8,115,935 B2 * | 2/2012 | Everett et al. | 356/497 |
| 8,155,935 B2 * | 4/2012 | Meiners et al. | 703/2 |
| 8,191,307 B2 * | 6/2012 | Donoghue et al. | 47/48.5 |
| 8,500,996 B1 * | 8/2013 | Bunting | 210/151 |
| 8,889,013 B1 * | 11/2014 | Coleman | 210/760 |
| 2002/0162668 A1 * | 11/2002 | Carlson et al. | 172/4.5 |
| 2003/0078901 A1 * | 4/2003 | Coppola, Jr. | G01V 9/02 706/21 |
| 2004/0144704 A1 * | 7/2004 | Johnson | 210/170 |
| 2004/0168358 A1 * | 9/2004 | Stump | 37/348 |
| 2008/0167931 A1 * | 7/2008 | Gerstemeier | G06Q 10/06 705/7.22 |
| 2011/0308618 A1 * | 12/2011 | Lorenz | 137/1 |
| 2012/0228117 A1 * | 9/2012 | Panunzio | 203/10 |
| 2013/0311144 A1 * | 11/2013 | Meiners et al. | 703/1 |
| 2014/0151294 A1 * | 6/2014 | Prior et al. | 210/605 |

* cited by examiner

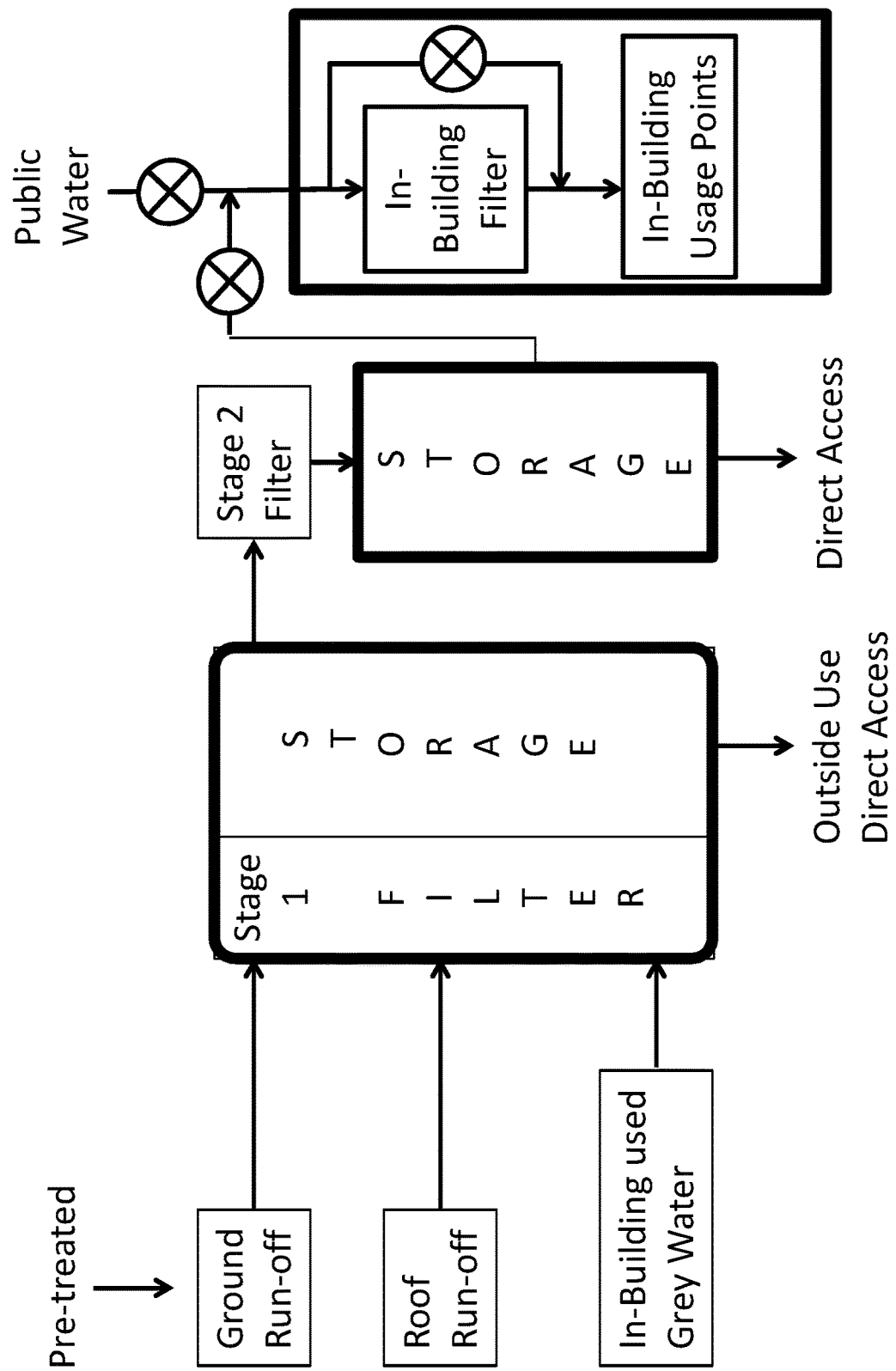

METHOD AND SYSTEM FOR WATER RECLAMATION, PURIFICATION, AND REUSE FOR RESIDENTIAL, COMMERCIAL, AND AGRICULTURAL APPLICATIONS

CROSS REFERENCE TO RELATED APPLICATIONS

This application claims the benefit of U.S. Provisional Application Ser. No. 61/782,659, filed Mar. 14, 2013, entitled "A Method and System for Water Reclamation, Purification, and Reuse for Residential, Commercial, and Agricultural Applications" which is hereby incorporated by reference in its entirety.

BACKGROUND OF THE INVENTION

Field of the Invention

This invention is in the field of water reclamation and conservation, collecting rain and snow water run-off and used grey water, purifying the collected water, and recycling for varied usage in residential, commercial, and agricultural applications.

Description of the Background

Water is a life sustaining and necessary resource rapidly becoming scarce. The world's aquifers are increasingly at risk of exhaustion and collapse. To help avoid disastrous water shortage, methods, equipment and components are needed for water reclamation and conservation, such as collecting rain and snow run off, waste water, used grey water, and treating the collected water for varied usage must be developed, made available off-the-shelf, promoted, and implemented. A lack of availability of methodology, systematic approach, tools and equipment, and off-the-shelf components have made the implementation of water reclamation and conservation difficult and costly to implement. The present invention provides methods and systems of that are automated and standardized, can be easily made commercially available, such that builders, property owners, farmers and townships can readily install and implement the water reclamation and conservation measures stated in the present invention.

SUMMARY OF THE INVENTION

The present invention proposes standardized methods, analysis algorithm, calculation equations and formula to determine an efficient run-off and grey water reclamation and reuse strategy and system. Pre-manufactured, standardized, off-the-shelf components and equipment that can be assembled on site to collect rain/snow run-off and waste water, systematically process the collected water for various reuses are also proposed.

A computerized automation method and system takes topographical survey data of a contiguous land, intended building sizes and estimated water usage, guidance for owner preferences and desired landscape layout (for example: leaving large space for gardens, locations and types of trees, vegetation, and garden types, place buildings in what orientations and locality, long or short driveway preferred, etc.) as well as data bases on local ordinances and setback requirements, vegetation water needs, building energy and water needs, local per person water consumption needs, area rain and snow fall data as input to determine optimized options for building sites, drive way and parking locations, run-off water collection strategies, collection ditch and storage tank locations and sizes, purification needs, methods and stages for various usages, as well as their interconnections. The present invention also proposed components and equipment for making water reclamation and reuse easier to execute. The automation program also performs calculation of needed components and equipment for the proposed options, and presentation of the lists of components and equipment needed, as well as costs and estimated man-hour needed for installation. Various representative methods, components, equipment, and their interconnections are proposed and illustrated.

BRIEF DESCRIPTION OF THE DRAWINGS

The present invention will be described hereinbelow in conjunction with the following figures, in which like numerals represent like items, and wherein:

FIG. 7 illustrates a whole house, in-building water purification and treatment system removes trace amounts of potentially harmful substances such as chloride and fluoride, acids and other chemicals, pharmaceutical drugs, excess minerals, microbial such as fungus, bacteria and that may have been missed by the treatment and purification systems described earlier. This in-building system can be shared between treating the public water and reclaimed water as described in FIGS. 4 and 5. At this stage important and beneficial minerals can also be injected into the water, and the PH level of the water adjusted as desired.

DETAILED DESCRIPTION OF THE INVENTION

Figure 1:
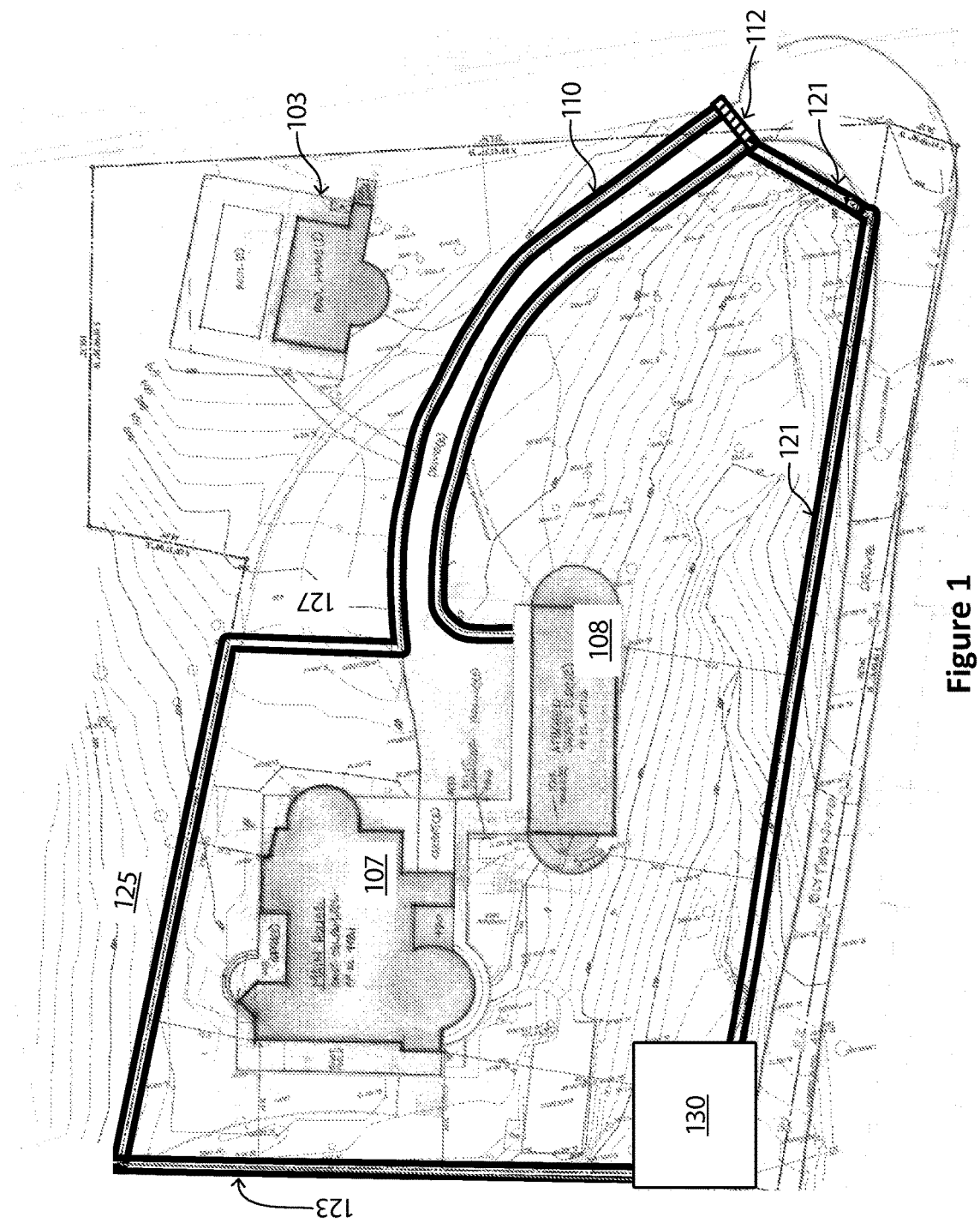
FIG. 1 illustrate the location and size of an optimized ground run-off water collection system are determined by taking as input data a combination of a property topographic survey map, water usage needs for occupants and vegetation, area rain and snowfall data, estimated total water usage volume per week, and a list of available standardized and off-the-shelf components and equipment and prices thereof, as well as owner preferences, and analyzes and calculates against a set of rules, equations, and formula. An automation program is written to automate the analysis and calculations. Adjoining properties—such as a neighborhood or a township can share a common reclamation and purification system using the same methodology and automation program.

As illustrated in FIG. 1, a property topographic survey map indicating the property boundary lines, its lines of elevations, and approximate foot print of intended buildings (or if already built, the actual foot print and location of the buildings), setback requirements, water usage needs, and area rain and snowfall data, owner preferences and budge are taken as input. Analysis are made against a set of rules, equations, and formula to calculate run-off speed and rate of flow at various localities of the property, water accumulation volume and speed for a given configuration and location of a water collection ditch, pump horse power needed, storage tank size needed, filter filtration rate needed, and component and equipment needs and costs. Several feasible systems each optimized for a set of chosen factors, such as highest collection rate and storage capacity, or collection rate and costs and flexibility, etc. are determined and configured through the analysis. The natural topography is analyzed, building and driveway locations identified, and if needed economic modification of topography computed and proposed. Optimized run-off collection method, collection ditch locations, driveway run-off lanes, and storage tank locations and sizes are computed and presented along with purification methods and components and equipment needed and costs thereof, as well as estimated men-hour labor requirement and costs. Computerized automation program and accompanying databases are used to automate the analysis, calculation, presentation of proposals along with graphs, simulated pictures, pictures and specifications of components, the pros-cons and cost estimation of each. Even though the example illustrated in FIG. 1 is a residential property, commercial and agricultural properties, and a "community" of adjoining properties, such as a neighborhood or a township can share a common reclamation and purification system using the same methodology and automation program.

The highest elevation of the illustrated property is 505' between elevation line (101) and the flat area around the Pool House (103) site. The elevation of the planned driveway entrance gate (105) is 500'. The elevation of area from the North edge of the Pool House (103) midway toward the Main House (107) ranges between 504' to 500'. The natural ground elevation at the Main House and Garage sites is close to 498'. The primary slopes of the property slope down from East toward West and South East toward Northwest. The Main House sits on a knoll top, with relatively flat areas around it, and slopes down toward all sides. A computer program is designed to read as input the topographical survey of a property, its intended number and the approximate foot prints and usage of intended buildings to be built on the property, as well as rain fall and snow fall data of the area, and approximate water usage needs of the buildings and grounds, automate the determination of optimal options for the location and elevation of driveway, the width and depth of a driveway run-off lane, the location of a collection ditch, its depth, width, and pitch, the location and size of a collection/storage container/tank, and the filtering/purification/treatment needs and stages. Multiple containers can be used if the available land area is large to reduce the bulk and excavation depth of the storage containers. If buildings on the property are not yet built, the computer program also determines optimized locations for building sites and grading, building and roof orientations, gutter size, pitch and leader and the size and location of a storage tank for collecting roof run-off water, as well as driveway locations and grades, all optimized for water drainage, collection, usage, as well as energy sourcing, collection, storage and usage efficiencies.

A computer program is designed to read the topographical survey of a property, the intended number of buildings to be built on the property, and the approximate foot prints and usage of the buildings, as well as rain fall and snow fall data of the area, and approximate water usage needs of the buildings and grounds, including the intended vegetation, ornamental and edible, and local ordinance and set back requirements. Algorithms automate the determination of optimal options for the location and elevation of buildings and driveway, the location of ornamental trees and plants, edible fruit trees and plants, and locations of vegetable and herb gardens if desired. The width and depth of a driveway run-off lane, the location of a collection ditch, its depth, width, and pitch, the location and size of a collection/storage container/tank, and the filtering/purification/treatment needs and stages. Multiple containers can be used if the available land area is large to reduce the bulk and excavation depth of a storage container. If buildings on the property are not yet built, the computer program also presents several optimized options for building sites and related grading proposals, building and roof orientations, gutter size, pitch and leader and the size and location of a storage tank for collecting roof run-off water, as well as driveway locations and grades, balancing owner/user needs and preferences, water drainage needs, water conservation, reclamation and usage, as well as energy conservation, sourcing, collection, storage and usage efficiencies.

To optimize the water drainage and collection, the driveway is graded to be at 500' elevation. If not already naturally so, the land immediately south of buildings (107) and East of (108) needs to be graded to be sufficiently higher in elevation than the driveway, and to slope gently down away from the buildings. The natural elevation at the south side of the main house (107) is at approximately 498', which, aside from the area marked for basement and foundation, should be filled to near 500'. This can be done after the foundation and basement walls and floors are completed. The ground slopes down from there toward East and Northeast to 493.5° at the Northeast corner of the property and continues downslope toward the East and North neighbor properties. To the West of Building (107), the elevation also drops toward West and Northwest. The Northwest corner is the lowest at 485'. A natural ravine is formed near the West property line going from 500' at the Southwest corner to the Northwest corner's 485'. The main run-off water collection ditch (121) is dug from the West end of the driveway entry catch basin (113) under catch basin gridded metal cover (112) toward the nature gully near the West property line, and along the West property line to flow into a collection container (130). The collection container is placed in-ground at the Northwest corner of the property. A secondary run-off water collection ditch (123) is dug along the North property line and inject into storage tank (130). A third run-off collection ditch (125) can be dug along the Northeast property lines, to join the secondary collection ditch (123) at Northeast corner (117). Collection ditch (127) can be dug at the 498' elevation line, the lowest area between Pool House (103) and Main House (107), and connect (127) to (125). Garage building ground floor can be elevated a few inches above the 500' elevation of the driveway. The Parking Area surface adjacent to buildings (107) and (108) should be at approximately 2" above 500' and gently grade down toward the 500' of the predominant driveway surface elevation. The floor level of Car Port (109) and Garage (108) Driveway can be another few more inches above the 500'2" of the driveway surface immediately adjacent to the Car Port and Garage. Anywhere between 500'4" to 500'6" is a reasonable level for a smooth up-bump to drive across into the Car Port or Garage, while providing an adequate water barrier.

The Parking Area is graded with an incline toward the end section of the driveway connecting to the parking area. The driveway can be further refined to comprise a slight downgrade from the East edge toward the West edge of the driveway where the natural elevation is lower. A slight down grade from the Main House and Garage toward the driveway entry at the Southwest corner of the property is also desirable. A paved shallow driveway run-off drainage lane (110) is installed on a side of the driveway. In the case of this example property, the driveway run-off lanes are along both sides of the driveway:
1, along the East side of the driveway to catch run-off from the grounds uphill to the driveway;
2, along West side of the driveway to catch run-off from the driveway.
The run-off water drainage lanes are indented (concaved) lanes graded with a down slope length-wise from buildings (107) and (108) areas toward the driveway entry, paved, and connected to the run-off water collection system. Grounds around the Pool House (103) is higher than the drive way. Water from that area will flow down toward the driveway run-off lane, and with its downgrade inclination toward the driveway entrance, inject into a catch basin under its metal cover (112), and fed into the run-off collection ditch (121) at the West side of the driveway run-off drainage lane (110) and (111), and the downward grade of drainage lane (110) toward the driveway entrance near the Southwest corner of the property, and inject into the main run-off water collection pipe (110). While it is not necessary in the illustrated topography, in other situations one may choose to install driveway run-off drainage lanes only on one side of the driveway.

The first floor of Main House (107) can be built at an elevation anywhere between 500'5" to 500'24", approximately a slight bump-up to three 7" steps higher than the edge of the Parking Area adjacent to the building. The grounds immediately surrounding the building needs to be lower than the first floor elevation, but higher than the driveway elevation. A terrace at a desired elevation below the elevation of the first floor of Main House 107 can be installed with a very slight incline away from the Main House (107). If wheel chair entry is desired, a walkway can be devised to incline up smoothly to the terrace from the parking/driveway area. Otherwise, appropriately spaced steps can accomplish the purpose of easy entry and water barrier during heavy rainfall or snow-melt.

For the property illustrated, the predominant run-off flows are from East to West, and from Southeast toward Northwest. The secondary run-off flow is from South to North. The main run-off water collection ditch (121) is dug along the West end of the driveway entry catch basin (113) underneath its cover grate (112) toward the nature gully near the West property line, then parallel to the gully to flow into a collection container (130). The collection container is placed at the Northwest corner of the property. If so desired, a secondary run-off water collection ditch (123) can be dug along the North property line, and (125) along the East property line, to join the collection ditch (123) at Northeast corner (117). Collection Ditch (123) injects into the storage tank (130). Driveway run-off water collected in a run-off water lane along a side of the driveway graded to flow toward the East end of the driveway and inject into the catch basin (113) with basin cover (112). Rain or snow water on the driveway turn-around and parking area (109) flows toward the driveway run-off lane to the East of 109, when 109 is graded just a couple of inches from right in front of the garage to its east edge where the East side driveway run-off collection lane begins.

An additional run-off collection ditch (127) can be dug at the lower elevation area between Pool House (103) and Main House (107) as indicated. The elevation of the top of this ditch begins at the edge of the driveway at approximately 500', and joints collection ditch (125) at 498'. Additional space in the ditch can be dug and allocated for installation of pipes to pipe water from the storage container (130) located at the lowest elevation area of the property upward to the next level purification and storage station near a building, as well as to where desired for usage, such as near turn-around and parking area (109).

Once the location and size of the run-off collection ditch are determined and the ditch dug, one may simply cement the ditch, and cover the cemented ditch with mesh and grate to keep out the debris and protect the ditch from traffic. This, however, requires the employment of masons, and there is presently no standardized commercially and economically available system of mesh and grates to cover cemented run-off water collection ditch. Cemented ditch also makes future changes or modifications difficult.

Figure 2:
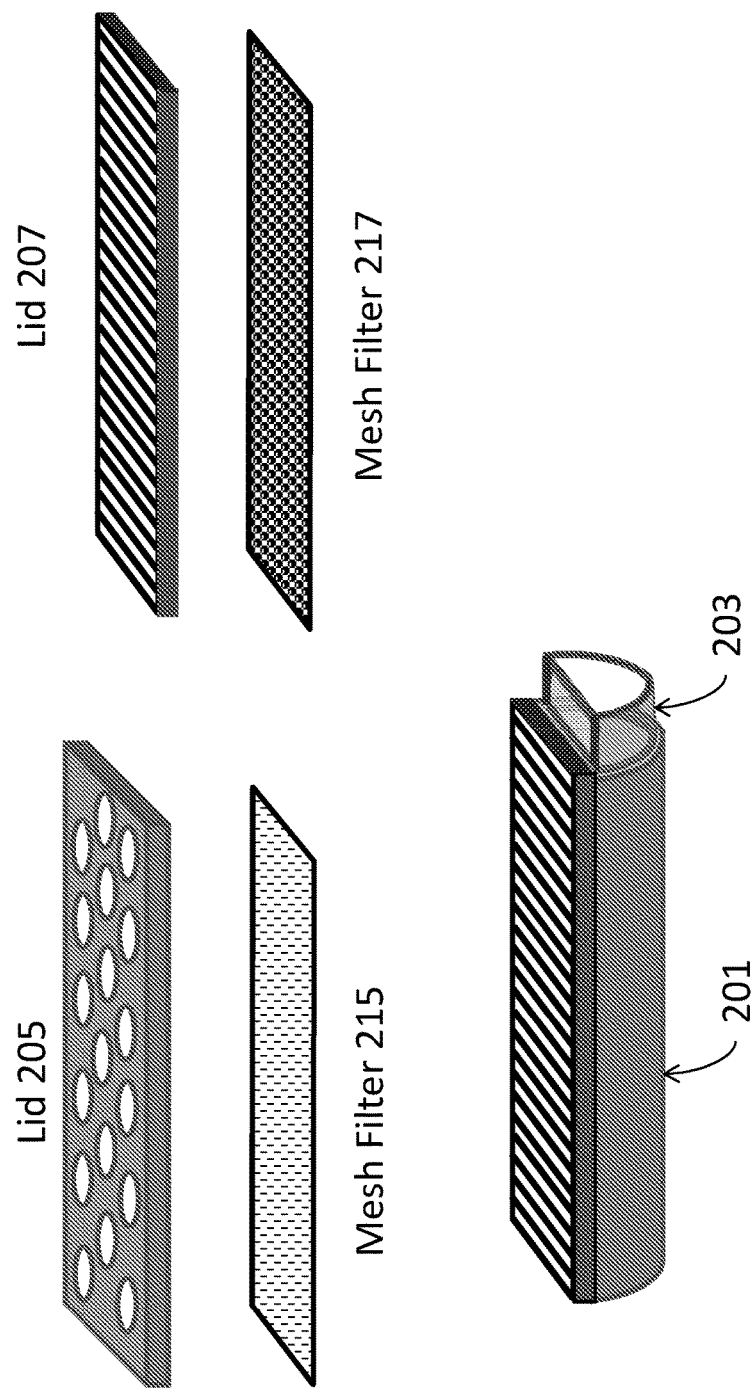
FIG. 2 illustrate pre-manufactured inter-connectable pipe sections for run-off water collection are illustrated. Also illustrated are pipe covers and mesh pre-filters that are compatible with the pipes.

FIG. 2 shows one method for completing the construction of the run-off water collection ditch:

A ditch edging strip is installed along the earthen edge of the raw ditch, and then a plastic liner is installed to line the raw ditch. A pre-manufactured, standardized flexible or rigid plastic drainage pipe of a standardized diameter for a needed collection capacity, with sufficiently large water flow-through holes on a top section of the pipe is laid in the plastic lined run-off water collection ditch. The pipe is then covered with flow-through landscaping fabric. The ditch is then covered with gravel. Alternately, the edging strip can be installed during the gravel-fill stage between the plastic liner and the gravel. If so desired for aesthetics and foot traffic, sufficiently porous artificial turf can be laid on top of the graveled ditch, and if desired extending to the surrounding grounds according to landscaping design.

Another method is to use Interconnect-able and stackable rigid half pipe sections of a pre-determined standard widths and lengths. These pipe sections are easier and cheaper to manufacture, store, and transport. An example of water-tight capable interconnection mechanisms is a tongue-in-groove mechanism. Another example is a sleeve-insertion interconnection. A sturdy cover with appropriately sized through-holes protects the half pipe and the ditch, while also allows adequate water flow-through. If so desired, a mesh with holes smaller than the lid through-hole can further prevent solid matters of sizes larger than the mesh holes and smaller than the lid through holes from wash through into the collection pipes, while still allows adequate water flow-through can be installed with the ditch cover. half-pipe sections as exemplified in (201), (202), (203) and (204). Semi-circular cross section, rectangular cross section, and other shapes, such as semi-oval can be used as the ditch lining pipe sections. A short piece of half pipe (203) serving as a connector, having its outer diameter/circumference that can be snug fit into the inner diameter/circumference of a run-off collection half-pipe, connects one run-off collection half-pipe with another. The smaller diameter short half-tube connector is the insert, and the run-off collection half-pipes are the sleeves. Tongue-in-groove interconnect can also be used. Another option of constructing the ditch liner half-pipe A sturdy lid such as (205) or (207) with substantial flow-through grids or holes covers and protects the ditch opening, as well as serving as a safety measure for human and animals who may walk across the ditch. The cover also serves to keep out debris larger than the flow-through holes from entering the collection ditch, while still allow adequate water flow-through capacity. For additional filtering of debris, a mesh (213), or (215) can be stacked beneath the lid. Since the ditch has a down-flow grade, an insertion-in-sleeve or a tongue-in-groove interconnecting mechanism will suffice. The simpler sleeve insertion interconnection mechanism as shown in (203) is easier to manufacture, and easier to use when replacing a damaged section when need arises. This and other interconnection mechanisms can be further sealed with an appropriate sealant.

Whole pipes with water flow-through holes on the upper half of the pipes can be used. In this case, the remaining space of the ditch should be filled with gravel for the protection of the pipe, the ditch, as well as human, pets, and animals that may walk around the grounds. Other options include sturdier and interconnect-able half-pipe sections made with higher grade material in combination with matching protection flow-through cover and filter mesh.

Figure 3A:
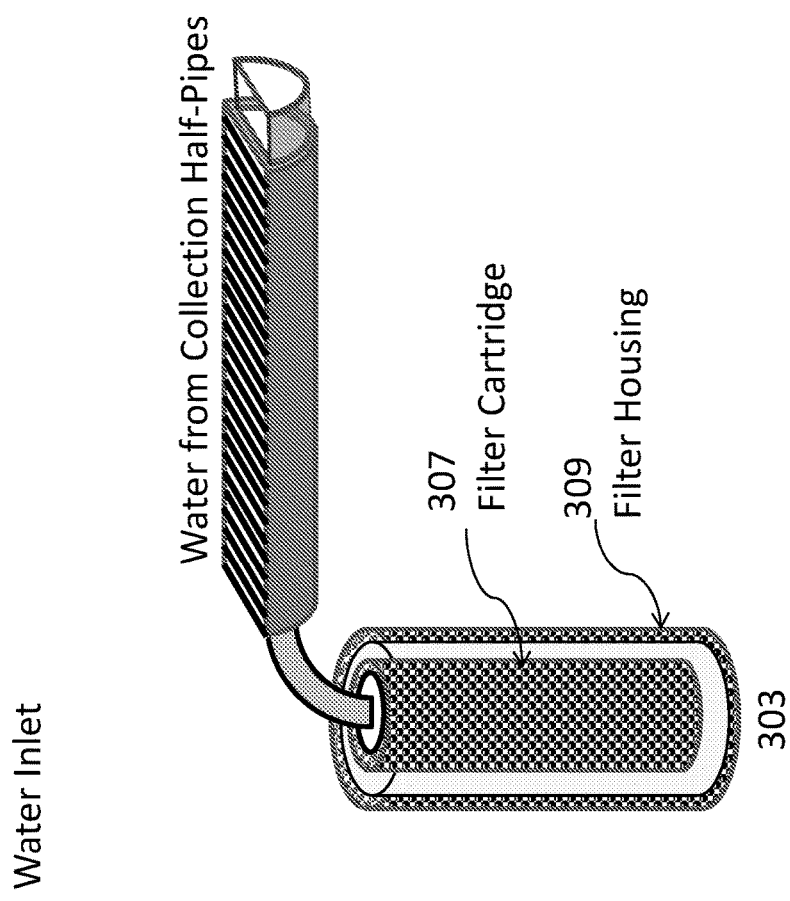
FIG. 3A. illustrated is a proposed inlet pre-filter with replaceable and exchangeable filter cartridge.
Figure 3B:
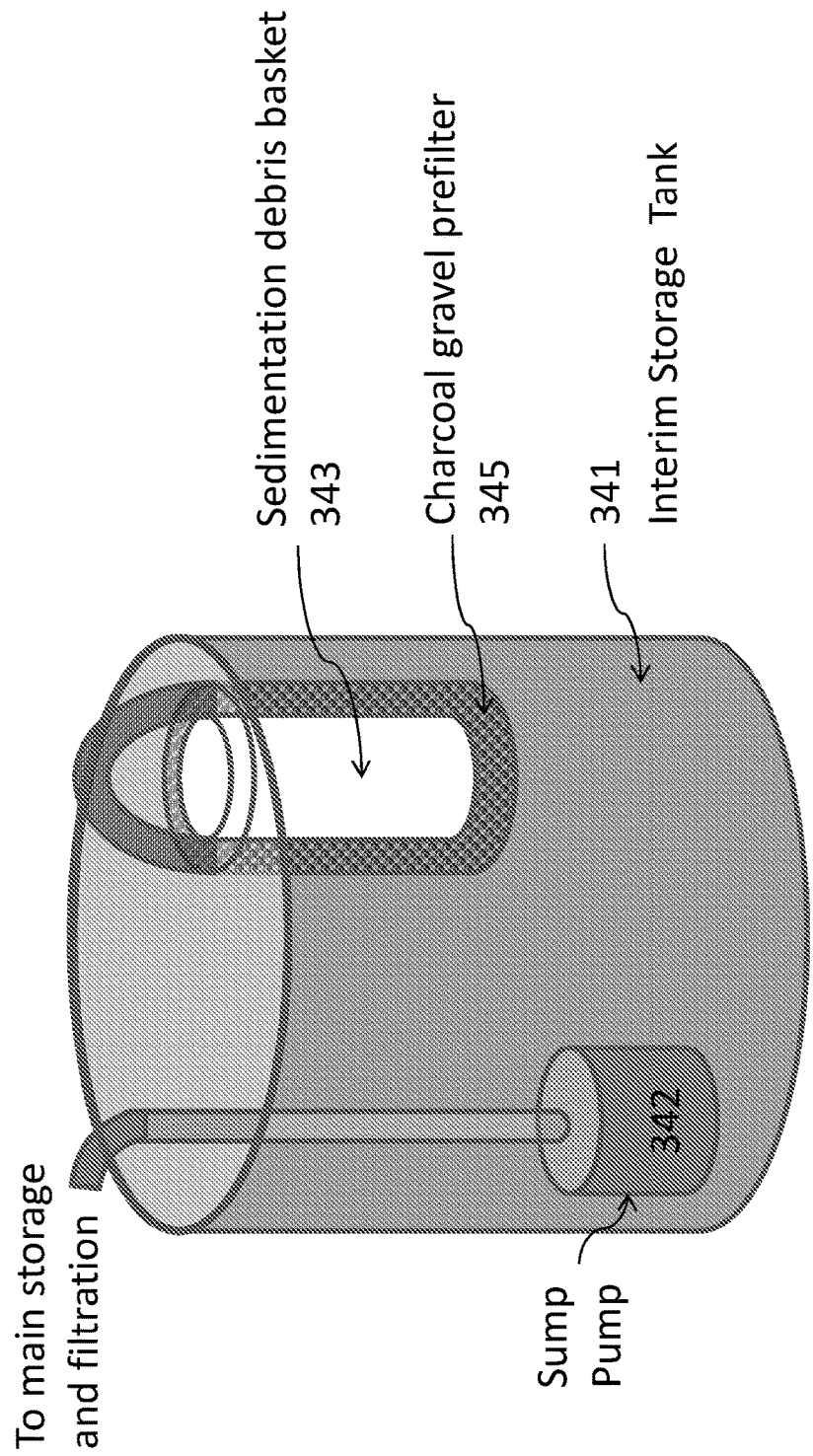
FIG. 3B. illustrated is a proposed inlet pre-filter arrangement with sedimentation debris bucket and charcoal gravel pre-filter for the initial treatment of run-off collected water.
Figure 3C:
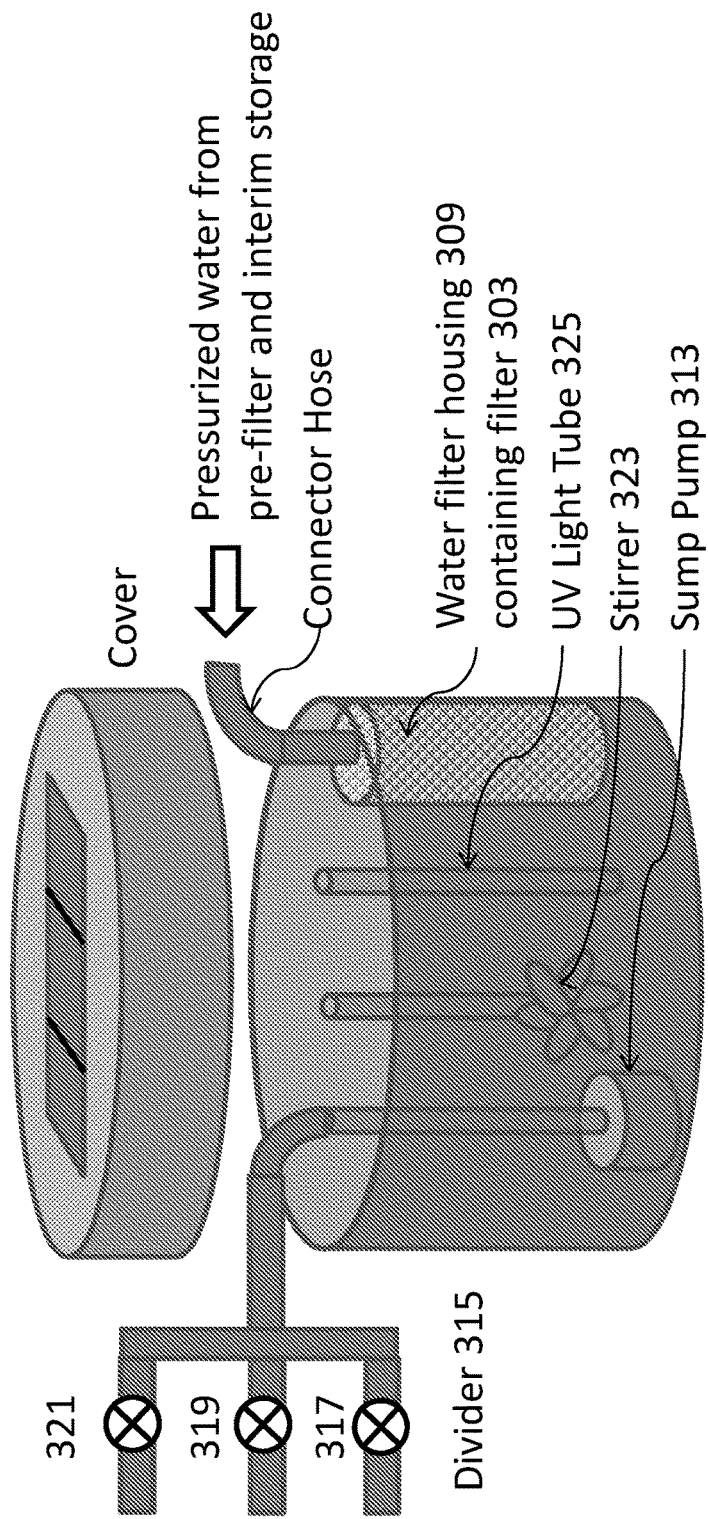
FIG. 3C. illustrates a water reclamation, purification, and storage system containing: a storage container body of a desired capacity, a removable tank cover which further comprises sub-sections that can be separately removed, for installing and accessing equipment in the tank, and performs routine maintenance. Installed inside the storage tank are: a pre-filter (as described in FIGS. 3A and 3B), a water stirrer, a sump-pump, optional anti-microbial chemical dispenser, and an optional ultra-violet light generator or Ozone generator. The sedimentation debris bucket and charcoal gravel pre-filter can be periodically removed for cleaning or replacement. The Sump-pump is used to pump water from a collection/storage container to a higher level filtration/purification and storage system, for overflow to a backup container, or for usage. With appropriate piping and float arrangement, an external pump can be used in place of the Sump Pump.

FIGS. 3A, 3B & 3C show treatment options for the collected water:

Collected run-off water flows through the down sloping collection pipes toward the in ground storage container (301) positioned at the lowest elevation area of the property. An adaptor connects the collection pipe to a flexible hose with a water tight connection. The hose is connected to a first stage filter using a charcoal, gravel, and sand filter (303), which is set through a feed-through hole on the lid of the storage tank (301), into the storage tank, and secured on the lid with the lip on the top of the filter housing. Both the filter housing (309) and filter cartridge (307), which contains the charcoal, gravel, and sand used for filtering action, is removable for cleaning or replacement. The filtered water flowing out of the gravel/sand/charcoal filter cartridge is fed into the in-ground storage container (301) through the sieve-like walls of the cartridge housing. The charcoal, gravel, and sand can be removed from the cartridge and cleaned or replaced. The flow-through filter housing (309) has a lip at the top to be secured at the through-hole rim on the storage tank-lid for mounting filter (303). The filtered water out of the filter cartridge (307) flows through the entire sieve-like walls of the filter housing (309) into the storage tank (301).

The storage tank (301) can be made with precast plastic without seams. A sump pump (313) is installed in the storage container through a feed-through (311) in the storage container lid. The pump action can be selected to turn on or off, or automatically set for when a stored water level in the tank reaches a certain height, or for when the stored level of the next stage purified water is low to pump the stored water to the next stage purification and storage station, or for usage of the stored water in the container. The outlet of the pump can be divided into multiple streams using a divider (315) with adjustable-flow control valves (317), (319), (321). The flow division between the multiple flows can be pre-set for typical usage and rainfall conditions and adjustable either manually or automatically according to detected stored levels of the water stored in the various storage containers, and/or according to the detected rainfall conditions.

As an example, out flow from one valve (317) can be used directly turn on or off for access for an intended usage, valve (319) diverted to an additional over-flow storage container, and out flow from another valve (321) can be piped to the inlet of the next stage purification and storage facility. A mechanical stirrer (323) is installed through a tank-lid feed-through inside the storage container. The stirrer (323) is programmed to turn on periodically to give movement to the stored water to prevent bacteria, mold, and vegetation growth. While not necessary in this stage, an optional UV light or Ozone generator (325) can also be installed inside the storage container to further kill microbes. A dedicated generator provides electricity needed to operate the station. The generator can be run by compressed natural gas, solar, or gasoline. The cover for the storage tank has sub-sections removed that have lips o serve as feed through holes for the in-tank equipment described above: the filter cartridge housing, the mechanical stirrer, the sump pump, and an UV or Ozone generator. The lids for these feed through holes are separated in two halves, each having a half shaft hole that can go over the shaft, cables and pipes of the intended equipment, and are separately removable, such that the in-tank equipment can be easily removed for servicing or cleaning.

Water collected through the collection pipes can also be accumulated in an interim container (341). A sump pump (342) is installed in interim container (341) to pump the accumulated water to the main treatment filter (303) in (301). In this case, the pressure feed of pretreated water pumped from the interim storage tank enables one to use an above the ground tank for storage tank (301) if so desired. Also, a higher performance accordion style filter or a combination of activated carbon and membrane filter can be used with storage tank (301). However, the cheaper charcoal/gravel/sand filter may still be a preferred choice for this stage, albeit one may use finer grade charcoal, gravel, and sand. With pressure feed, the charcoal/gravel/sand cartridge can also filter at a higher throughput. The cartridge can also be lined with a membrane to achieve a higher level of filtration. The interim container also can include a removable basket (343) to collect the sediment and debris that would sink to the bottom of the basket. Basket (343) can be lifted out of container (341) to clean out the accumulated sediment and debris. The interim container (341) can also include a charcoal/gravel pre-filter (345) with sand as an optional filtering medium, which can also be lifted out of (341) for cleaning and service.

The components described are all manufactured to fit together and available as tools and components in kits for easy installation of a water reclamation system with capacities for land areas with a range of rain and snow fall, and designed for residential, commercial, or agricultural uses with desired grade of purification.

Figure 4:
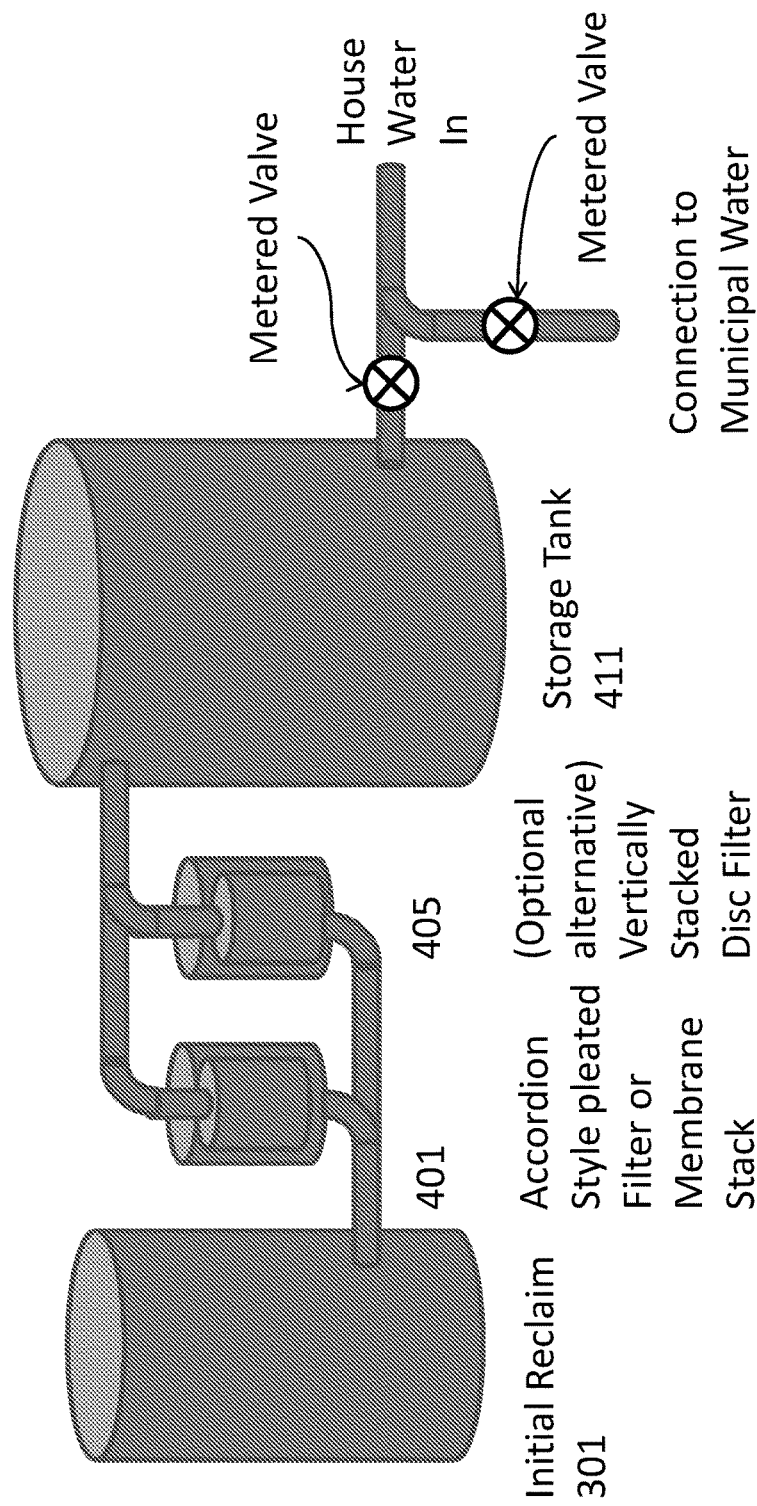
FIG. 4 illustrates the further purification of the pre-treated water as described in the previous Figures to make it suitable for human consumption. A next level purification system receives pressurized water from the pre-treated water storage, further filters and treats it before it is pumped and piped into a storage tank. The source of water to enter the house can now be selected from the on-site treated reclaimed water or from the municipal (external) water connection.

FIG. 4 illustrates further purification and pre-usage storage:

A next level purification and storage station (401) receives pressurized water from a sump-pump outlet of the initial reclamation stage (301). A conventional removable accordion style filter with pleated filtering fabric or membrane pack (403), or a vertically stacked filter discs (405), housed in a cylindrical housing (407) can be used in this case. After filtration, the filtered water is piped into storage tank (411). Station (401) can be located at a higher elevation near a primary building on the property. As an example a flat roof top of a utility storage cabinet (413) built outside of a side or back wall of a building near where the public water enters the building, or flat area on the roof of a garage can serve as a place where (407) and (411) can be located. Filter (403) for this stage preferably is separate from the storage tank (411) for easy access. An outlet located at the side of a lower portion of storage tank (411) feeds filtered water into the house line. A valve and a meter can be installed at this outlet, so that water usage from the reclaimed water versus from the public water can be monitored.

A commercially available in house whole house water filtration and purification system utilizing a combination of activated carbon and hollow-fiber membrane filtration, or a combination of nano-filtration membrane and reverse-osmosis can be installed to filter either the reclaimed water from storage tank (411), or public water piped in through the water main. Complete and balanced nutrient trace-mineral can be added at this stage if so desired.

Figure 5A:
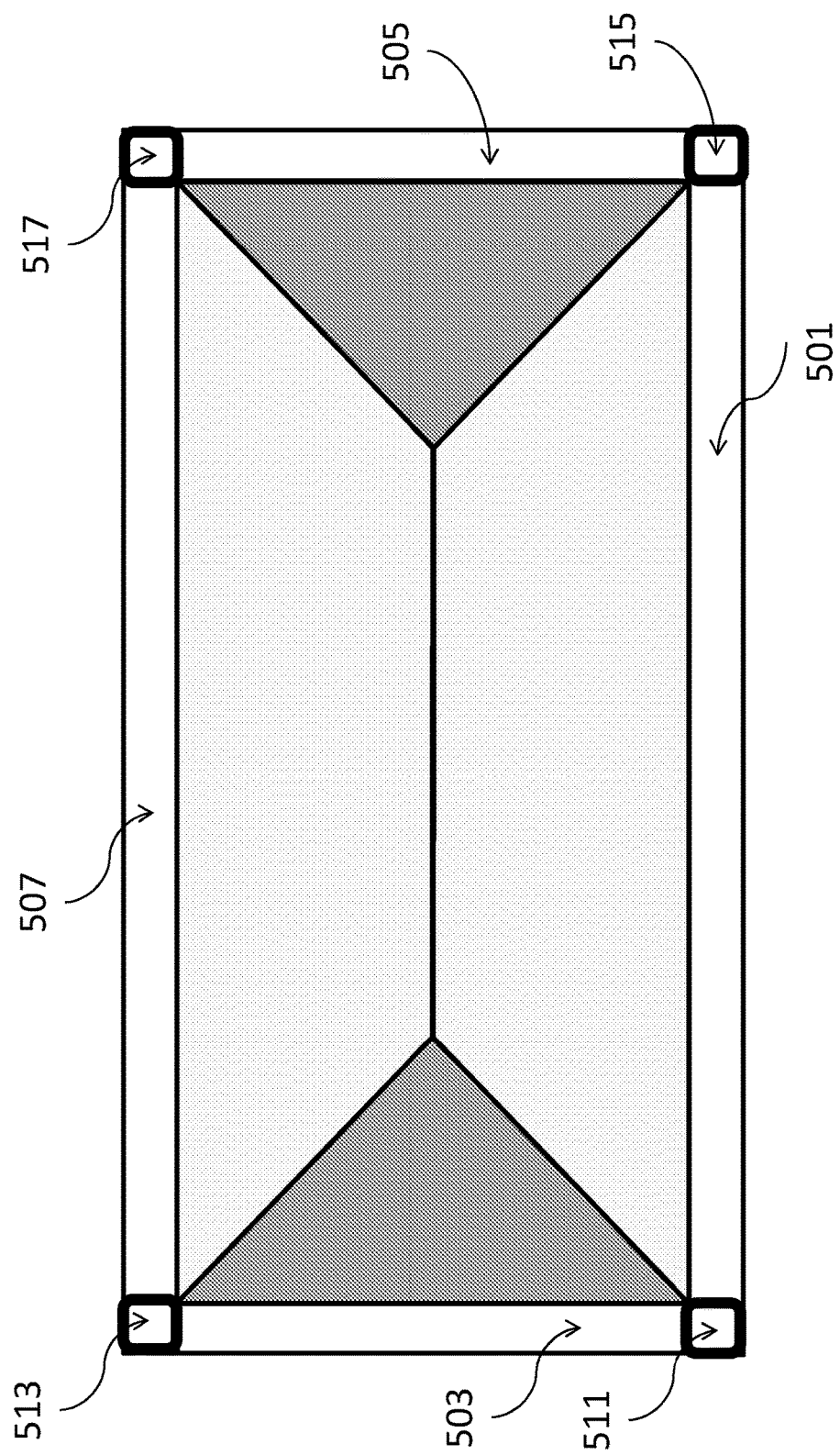
FIG. 5A. illustrate the roof run-off water guided into gutters and downspout locations.
Figure 5B:
FIG. 5B. illustrate how run-off water from roof and gutters can be piped directly to a separate above ground storage and filtration station. Multiple down-spout/leader can be converge into one storage and filtration station by running horizontally or near horizontally after a predetermined length of downward direction to converge to a predetermined large capacity convergent downspout.

FIG. 5 illustrates a roof run-off water collection system.

In a conventional gutter and leader system that collects the roof run-off, a leader is a downward pipe connected to a horizontal gutter at a select location on the gutter that takes the rain or snow melt run-off water from the roof that collects in the gutter down to the ground. A conceptual example of a roof, gutter, and leader relationship is show in FIG. 5A. Gutters (501)-front, (503)-side, (505)-side, (507)-back, and leaders (511), (513), (515), (517), collect the run-off water from the roof. The conventional leaders are installed vertically down to the ground level, are connected to drainage pipes near the ground level either above or below ground to pipe water away from the building. The collected roof run-off water is discharged at a place where the ground slopes away from the building and the water eventually flow away outside of the property to street catch basin and public rain water drainage system, or discharged to the edge of the street, or a street side catch basins, which is connected to public rain water drainage system. At the most basic level, one can collect the rain/snow run-off water from the roof/gutter/leader system by terminating each leader into a water storage tank. From there one can interconnect the storage tanks, and use a pump to pump water to a shared treatment and storage station such as described in FIG. 4. One can also inter connect the leaders at the ground level with a ground level piping loop, which terminates into an interim storage tank on the ground level. A sump pump pumps the stored water from the interim storage tank to a treatment and storage station. The treated water is then connected to the house water system through a valve.

In a more direct approach for a simpler roof, one can bend the leaders after a predetermined downward length, and route it against and along the building's walls horizontally, or with a slight downward angle from horizontal toward a selected position at the back of the house where the leaders converge into a larger capacity vertical leader, which then injects the collected water enter into storage tank. This would reduce the number of storage tanks needed to one, or two in number. The rain water storage tank can also be located a desired elevation above ground to take advantage of gravity feed for processing and usage. The processed water is then connected to the main water intake pipe of the building through a control valve. The public water also feeds into the main water intake pipe through its own control valve.

For example, leader (511) for gutters (501) and (503) makes a curved bend using a bend-adapter (523) from the initial short conventional vertical section of (511), runs horizontally or nearly horizontally along wall beneath gutter 503 toward leader (513). If leader (513) location is chosen to be storage site, (511) is then connected to a large capacity leader (513), which is connected to a storage tank (533). Similarly leader (515) for gutters (501) and (505) makes a bend using the bend-adapter (523) and runs horizontally or near horizontally on the wall underneath gutter 505 to join leader (517), if the position of leader (517) is also chosen to be a storage site. Leader (517) is then connected to a storage tank (537). In this case, the cross section of leaders (513) and (517) is twice the cross section size of leaders (511) and (515) to accommodate the added water volume from leaders (511) and (515). If one chooses to use only one storage tank, for example if at site (513), leader (517) makes a bend and runs along back wall underneath gutter 507 toward leader (513), and connects to it. In this case the cross section of leader (513) needs to be 4 times of the cross section of leaders (511) and (515), and leader 517 is twice that of 511 and 515. Leader (513) then feeds into an above ground storage tank of adequate capacity. In this case, the capacity requirement of the storage tank will be twice as large as when two storage tanks are used at two back wall leader locations. The storage tank can be equipped with a pre-filter as in 301, if so desired and allocated budget allows. The primary filter for stored rain water is located in line between the stored rain water and the building where the water will be used. If feasible, the storage tank can be located above where the public water is pipe into the building to minimize the energy requirement of pumping the reclaimed water into the building. If it is placed above the main floors of the building, as in an elevated "balcony, or on top of an exterior closet or attached garage roof as described in FIG. 4, even more pumping energy can be saved. The stored rain water can also be filtered and pumped into a storage container located on the roof top of the building, or an elevated water tower. This water would be available for in-building use through gravity feed even when both public electricity and the generator electricity become unavailable after prolonged power outage.

Figure 6:
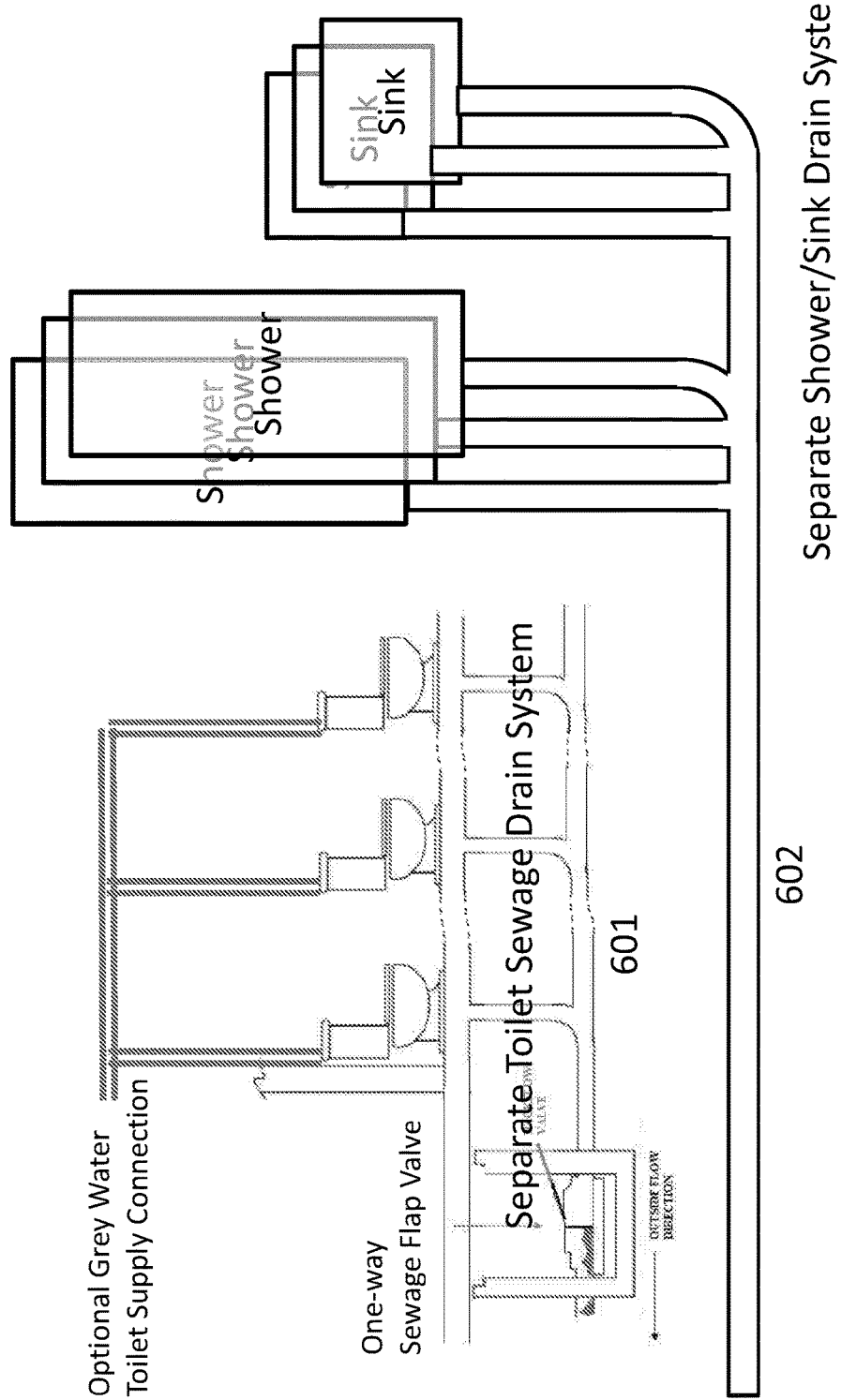
FIG. 6 illustrates the in-building waste water drainage system is separated into two subsystems: 1) toilet waste drainage subsystem (601), and 2) sink, shower, and bath drainage subsystem (602). The toilet drainage can be connected to a municipal sewage system, on-site septic tank, or if so desired, to a separate on-site sewage treatment system for the purpose of producing clean organic fertilizers. The sink, shower, and bath waste water is piped to a grey water collection and pre-treatment system as described in FIG. 3 for lower grade usage. The pre-treated water can be pumped to higher grade purification and storage system as described in 4 and 5 for higher grade uses as needed. The toilet flushing water supply line can be separated from personal hygiene and drinking and cooking water supply line, and be supplied from a lessor grade reclaimed water source. Household cleaning water supply line can also be separated and therefore separately supplied, or supplied along with the toilet flushing supply line.

FIG. 6 illustrates the separation of in-building drain pipes into grey-water and sewage-water.

Toilet drain pipes (601), (603) feed into the sewage drain system (611) of the building. For buildings that are connected to public sewage system, (611) is most economically piped directly to the public sewage system. For a large campus of multiple buildings, or on agriculture properties, (611) can be piped to an onsite sewage treatment system. Grey-water drain pipes under sinks, showers, and tubs, is collected in a separate in-house grey water drainage, collection, treatment, and storage system, treated and stored for reuse.

A serious public sewage water problem is caused by building occupants or employees dumping seriously polluting substances such as medicine, cleaning chemicals, paint thinners, thinned paint, pesticides, and other toxic but common chemicals into sink drains. This should certainly be excluded from the water reclamation system. A separate chemical dump sink with a separate drain that collects such wastes into a dedicated container that can be picked up by commercial or public treatment facility for separate and specialized treatment, for example, using plasma-arc gasification technology.

Toilet flushing water supply line can be separated from the personal hygiene, drinking and cooking water supply line, and be supplied from a lessor grade purified reclaimed water. Household cleaning water supply line can also be separated and separately supplied, or supplied along with the toilet flushing supply line.

FIG. 7 illustrates a by-passable whole house water purification and enhancement system.

This system can be used for both incoming public water, as well as the reclaimed water. Commercially available systems, such as activated carbon and membrane, Nano-membrane, reverse osmosis, hollow-fiber membrane are highly effective down to 0.1 micron size in removing impurities including chlorine and chlorine disinfection by-products, trace organic pharmaceutical, trace toxic substances such as mercury, lead, aluminum, and Fluoride, as well as microbes such as fungi spores, mold, parasite, etc. Sodium Chlorite and Chlorine Dioxide, as well as Ultraviolet Light or Ozone kills micro bacteria and viruses. Activated carbon alone also kills a very large percentage of microbes. The purified water fit for drinking can be further treated for a slightly basic PH, and added to it balanced mineral nutrients that are lacking in the geographic area. The bi-product of converting neutral PH water to a slightly basic PH level is slightly acidic water on the other hand, which can be used for chemical free household cleaning.

What is claimed is:

1. A method of assembling a plumbing system for water reclamation around a landmass, comprising: providing:
   a first drain line configured to receive water from at least one in-building, used water source of a first group of sources and piped to a first community shared water purification system graded for purifying the first group of sources and a first intended re-use;
   a second drain line configured to receive water from at least one in-building, used water source of a second group of sources, the second group of sources being different from the first group of sources and wherein the second drain line does not communicate with the first drain line and is in communication with a destination point; and
   a third drain line configured to receive water from an external source, the external source being rain water or snow melt exterior to a building wherein the third drain line is separate from the first and second drain line and is piped to a second community shared water purification system graded for rain water and snow melt; and
   wherein the first, second, and third drain lines located and sized based on a reuse strategy computed by a community shared computing system comprising a hardware processor and a memory;
   wherein the reuse strategy includes a purification strategy according to detected chemical and biological content and the reuse strategy is further based on topographical survey data of the landmass, area rainfall and snowfall data, one or more building sizes of the landmass, run-off speed and rate of flow at one or more locations of the landmass, and water accumulation volume and speed at one or more locations of the landmass;
   wherein the first group comprises in-building sources other than a toilet or dump sink wherein the dump sink receives chemical, pharmaceutical, or other regulated industrial waste.

2. The system for water reclamation of claim 1, the second group is further separated into subgroups.

3. The system for water reclamation of claim 1, further comprising the destination point is a second purification system graded for a second re-use.

4. The system of claim 1, further comprising at least a portion of the first intended re-use water is further communicated to a higher level water purification system, which communicates the treated water back into a building for a higher level in-building use.

5. The system of claim 1, further comprising the purification system is upgraded to a desired quality and communicated to a separate, higher level use in-building household supply line.

6. The system of claim 1, further comprising the first drain line is piped to a water purification system that purifies water collected from a roof.

7. The system of claim 1, further comprising a first supply line for drinking, cooking, and food and personal washing which is separated from a second supply line for filling a toilet, doing laundry and household cleaning; and
   the second supply line receives at least some water from the community shared water purification system.

8. The system of claim 1, the first drain lines of multiple buildings in a community are connected together to a first community purification system, and the third drain lines of multiple buildings in a community are connected together to a third community purification system.

9. A method of assembling a plumbing system for water reclamation of a landmass, comprising: providing:
   a first drain line configured to receive water from at least one in-building, used water source of a first group of sources and piped to a first water purification system graded for a first intended re-use;
   a second drain line, different from the first drain line, receiving water from at least one in-building, used water source of a second group of sources, the second group of sources being different from the first group of sources and piped to a second water purification system graded for a second intended re-use;
   a third drain line receiving water from an external source, the external source being rain water and snow melt collected from surfaces surrounding a building, the third drain line is separate from the first and second drain line and is piped to the first water purification system;

a first supply line receiving water from the first water purification system wherein the received water is graded for drinking, cooking, food preparation and personal washing; and a second supply line receiving water from the second water purification system wherein the received water is graded for filling a toilet reservoir, household cleaning, and clothes laundering;

wherein the first, second, and third drain lines are located and sized based on topographical survey data of the landmass, area rainfall and snowfall data, one or more building sizes of the landmass, run-off speed and rate of flow at one or more locations of the landmass, and water accumulation volume and speed at one or more locations of the landmass as determined by automation and accompanying databases for a community of buildings.

10. The system of claim 9, the first group comprises in-building sources other than a toilet or dump sink that receives chemical, pharmaceutical, or other regulated industrial waste.

11. The system of claim 9, the second group comprises in-building sources comprising a toilet and a dump sink that receives chemical or pharmaceutical waste.

12. The system of claim 11, the second group is divided into subgroups, separating chemical and pharmaceutical waste from toilet waste.

13. The system of claim 12, the chemical and pharmaceutical waste is conducted to a collection container for separate collection, and toilet waste is conducted to a public sewer system or a private septic tank.

* * * * *